(12) United States Patent
Choi et al.

(10) Patent No.: US 11,392,241 B2
(45) Date of Patent: Jul. 19, 2022

(54) ELECTRODE CONNECTION STRUCTURE AND ELECTRONIC DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 33 days.

(21) Appl. No.: 16/170,505

(22) Filed: Oct. 25, 2018

(65) Prior Publication Data
US 2019/0129535 A1 May 2, 2019

(30) Foreign Application Priority Data

Oct. 27, 2017 (KR) .................. 10-2017-0140874

(51) Int. Cl.
*G06F 3/044* (2006.01)
*G06F 3/041* (2006.01)

(52) U.S. Cl.
CPC .......... *G06F 3/04164* (2019.05); *G06F 3/044* (2013.01); *G06F 3/0446* (2019.05); *G06F 2203/04103* (2013.01)

(58) Field of Classification Search
CPC ............... G06F 3/044; G06F 3/04164; G06F 2203/04103; G06F 3/0446; G06F 3/041; H01B 7/00; H01B 9/006; H05K 1/111; H05K 3/341; H05K 2201/0969; H05K 2201/09663; H05K 2201/10689; H05K 2201/09063; H05K 2201/10969; H05K 2203/1178; Y10T 29/49128; Y02P 70/50
See application file for complete search history.

(56) References Cited

U.S. PATENT DOCUMENTS 5,842,275 A * 12/1998 McMillan, II ....... H05K 1/0206
29/840
6,633,361 B1 * 10/2003 Fujita .................. G02F 1/13452
349/149

(Continued)

FOREIGN PATENT DOCUMENTS

CN 101431047 A 5/2009
CN 208903231 U 5/2019
(Continued)

OTHER PUBLICATIONS

Office action dated Sep. 2, 2019 from Japan Intellectual Property Office in a counterpart Japanese Patent Application No. 2018-199371 (all the cited references are listed in this IDS.) (English translation is also submitted herewith.).

(Continued)

*Primary Examiner* — Temesghen Ghebretinsae
*Assistant Examiner* — Karin Kiyabu
(74) *Attorney, Agent, or Firm* — The PL Law Group, PLLC

(57) ABSTRACT

An electrode connection structure includes a substrate layer, a plurality of pads on the substrate layer, and an insulation layer at least partially covering the substrate layer and the pads. The insulation layer includes a plurality of holes on the pads and at least one first groove line extending between the pads neighboring each other.

14 Claims, 6 Drawing Sheets

(56) References Cited

U.S. PATENT DOCUMENTS

| | | | | |
|---|---|---|---|---|
| 2012/0044191 A1* | 2/2012 | Shin | ......................... | G06F 3/044 |
| | | | | 345/174 |
| 2015/0355747 A1* | 12/2015 | Lin | ....................... | G06F 3/0416 |
| | | | | 345/174 |
| 2016/0250875 A1* | 9/2016 | Tarnowski | ........... | H05K 3/1275 |
| | | | | 345/173 |

FOREIGN PATENT DOCUMENTS

| | | | |
|---|---|---|---|
| JP | 2000-221540 A | | 8/2000 |
| JP | 2005-10775 A | | 1/2005 |
| JP | 2006-179809 A | | 7/2006 |
| JP | 2013045246 A | * | 3/2013 |
| JP | 2013156773 A | * | 8/2013 |
| KR | 10-2008-0002286 A | | 1/2008 |
| KR | 10-2012-0067795 A | | 6/2012 |
| WO | WO 2017/026708 A1 | | 2/2017 |

OTHER PUBLICATIONS

Office action dated Apr. 22, 2020 from Japan Intellectual Property Office in a counterpart Japanese Patent Application No. 2018-199371(all the cited references are listed in this IDS.).

* cited by examiner

ELECTRODE CONNECTION STRUCTURE AND ELECTRONIC DEVICE INCLUDING THE SAME

CROSS-REFERENCE TO RELATED APPLICATION AND CLAIM OF PRIORITY

This application claims priority to Korean Patent Application No. 10-2017-0140874 filed on Oct. 27, 2017 in the Korean Intellectual Property Office (KIPO), the entire disclosure of which is incorporated by reference herein.

BACKGROUND

1. Field

The present invention relates to an electrode connection structure and an electronic device including the same

2. Description of the Related Art

A touch screen panel includes a plurality of driving electrodes and receiving electrodes for implementing a touch sensing, and pads may be connected to the electrodes for an electrical connection between the electrodes and a flexible printed circuit board (FPCB).

A conventional cathode ray tube (CRT) display device has been rapidly replaced with flat panel display devices such as a liquid crystal display (LCD) device, a field emission display (FED) device, a plasma display panel (PDP) device, an organic light emitting diode (OLED) display device, etc.

A flat display panel may be divided in a display region and a non-display region. In the display region, pixels may be defined by gate lines and data lines crossing each other. In the non-display region, data pads and gate pads formed at terminals of the data lines and the gate lines, respectively, may be provided to communicate electrical signals with a driving device. The driving device may include a chip or a board for driving the flat display panel such as a driving integrated circuit (D-IC) or a flexible printed circuit board (FPCB).

The driving integrated circuit may be mounted in the flat display panel by a chip on glass (COG) method, a tape carrier package (TCP) method, a chip on film (COF) method, etc.

The flat display panel may include pads for implementing an electrical connection with the driving integrated circuit or the FPCB. For example, the pads may be electrically connected to the driving integrated circuit or the FPCB via an anisotropic conductive film (ACF). However, cracks may be caused in the pads when a lower substrate includes a soft material during a bonding process of the ACF.

For example, Korean Patent Publication No. 10-2012-0067795 discloses that a first pad and a second pad formed on an upper substrate and a lower substrate, respectively, however, fails to provide solutions for overcoming the above-mentioned problems.

SUMMARY

According to an aspect of the present invention, there is provided an electrode connection structure having improved adhesion and structural reliability.

According to an aspect of the present invention, there is provided an electronic device including the electrode connection structure.

According to an aspect of the present invention, there is provided an image display device including the electronic device.

The above aspects of the present inventive concepts will be achieved by the following features or constructions:

(1) An electrode connection structure, comprising a substrate layer; a plurality of pads on the substrate layer; and an insulation layer at least partially covering the substrate layer and the pads, the insulation layer including a plurality of holes on the pads and at least one first groove line extending between the pads neighboring each other.

(2) The electrode connection structure according to the above (1), further comprising a conductive layer at least partially covering the pads and the insulation layer.

(3) The electrode connection structure according to the above (1), wherein the plurality of the holes are arranged along a direction from one end of the pad to an opposite end relative to the one end of the pad.

(4) The electrode connection structure according to the above (1), wherein the first groove line includes portions having different widths.

(5) The electrode connection structure according to the above (4), wherein a width of the first groove line is changed periodically from one end to an opposite end thereof.

(6) The electrode connection structure according to the above (4), wherein a width of a terminal of the first groove line on an end portion of the substrate layer is not a maximum width of the first groove line.

(7) The electrode connection structure according to the above (1), wherein the insulation layer further includes at least one second groove line which extends from one end of the pad to an opposite end relative to the one end of the pad, and connects at least two holes of the plurality of the holes.

(8) The electrode connection structure according to the above (7), wherein the insulation layer further includes at least one third groove line connecting the first groove line and the third groove line neighboring each other.

(9) The electrode connection structure according to the above (1), wherein the pad includes a metal core and a conductive non-metallic coating layer thereon.

(10) The electrode connection structure according to the above (9), wherein the pad has a multi-layered structure.

(11) The electrode connection structure according to the above (9), wherein the conductive non-metallic coating layer has a multi-layered structure.

(12) The electrode connection structure according to the above (1), further comprising electrodes on the substrate layer, wherein the pads are connected to end portions of the electrodes.

(13) An electronic device including the electrode connection structure according to any one of the above (1) to (12).

(14) An image display device including the electronic device according to the above (13).

(15) A touch screen panel including the electronic device according to the above (13).

According to exemplary embodiments, the electrode connection structure may include an insulation layer including predetermined holes formed therein so that adhesion area and adhesion force between elements of the electrode connection structure may be improved.

The electrode connection structure may include a groove line formed between pads so that the adhesion between elements may be further improved. For example, bubbles generated while forming a conductive layer may be removed or discharged so that product reliability may be enhanced.

Further, the electrode connection structure may include the insulation layer and the groove line so that a stress applied to the electrode connection structure may be dispersed. Thus, an improved flexible property may be achieved while preventing a generation or a propagation of cracks so that process defects may be reduced.

An image display device or a touch screen panel including the electrode connection structure may have improved durability, and the generation or the propagation of cracks may be prevented therein.

DETAILED DESCRIPTION

Figure 1:
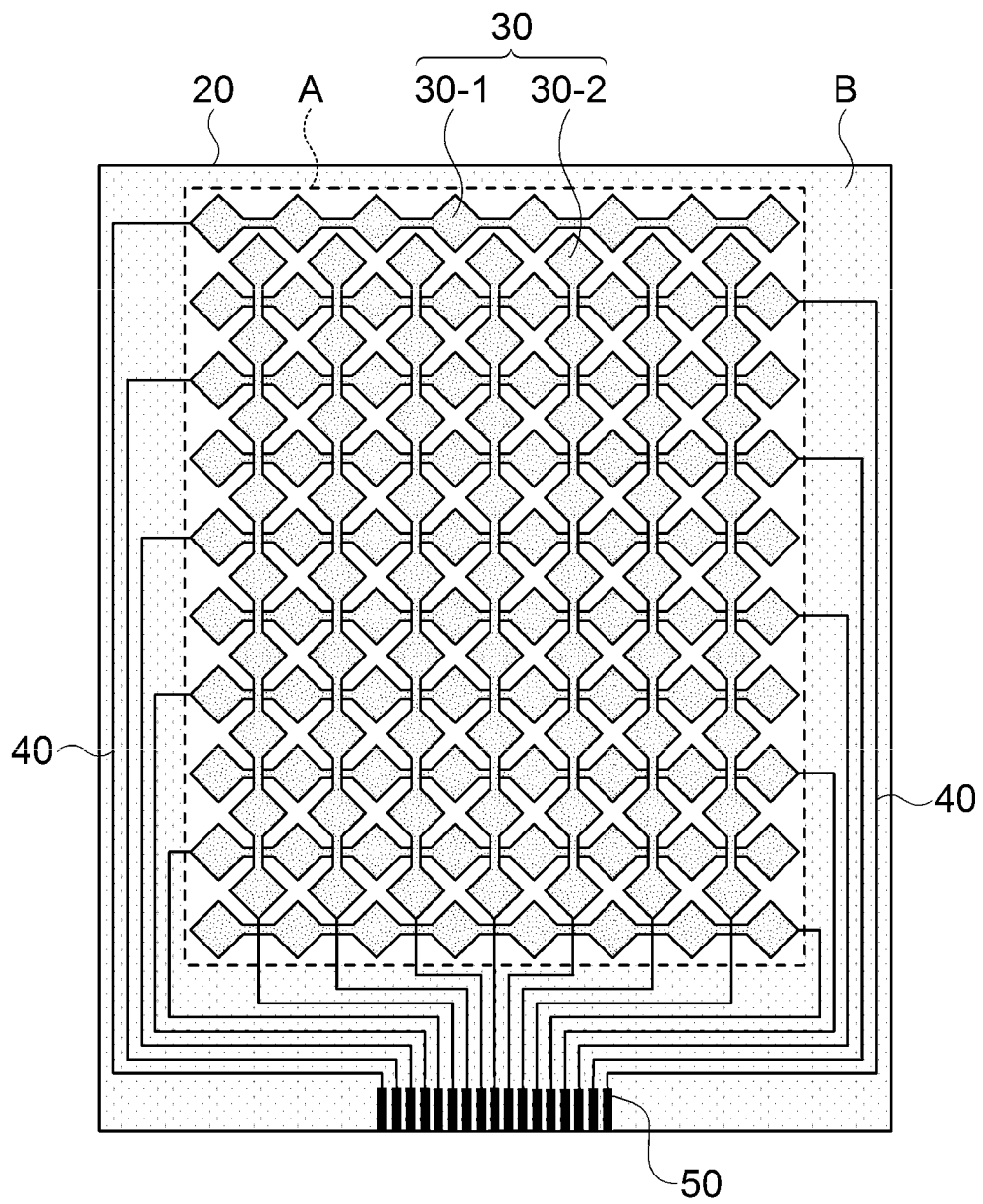
FIG. 1 is a schematic top plane view illustrating an electrode construction of a touch screen panel in accordance with an exemplary embodiment.

According to exemplary embodiments of the present invention, an electrode connection structure may include a substrate layer, a plurality of pads on the substrate layer, and an insulation layer at least partially covering the pads on the substrate layer. The insulation layer may include a plurality of holes on the pads and at least one first groove line extending between the pads neighboring each other. In the electrode connection structure, an adhesion between elements may be improved and bubbles may be prevented during a formation of conductive members so that a stress applied to the electrode connection structure may be dispersed, and a flexible property of the electrode connection structure may be enhanced while preventing cracks therein.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Like reference numerals may be used to designate like elements throughout the drawings. Detailed descriptions on elements and functions commonly known in the related art may be omitted for an effective descriptions of the present inventive concepts.

FIG. 1 is a schematic top plane view illustrating an electrode construction of a touch screen panel in accordance with an exemplary embodiment. Hereinafter, exemplary embodiments are provided in relation to the touch screen panel. However, the present invention is not limited thereto.

Referring to FIG. 1, a touch screen panel 10 may include a display region A and a non-display region B. The display region A and the non-display region B may be defined on a transparent substrate 20. The display region A may be formed in a central portion or an inside of the touch screen panel 10, and the non-display region B may be formed at a peripheral portion or an outer portion of the touch screen panel 10. Sensing electrode patterns 30 capable of sensing electrical or physical change by a touch of a user may be formed on the display region A. The sensing electrode patterns 30 may include first sensing electrode patterns 30-1 and second sensing electrode patterns 30-2. The first and second sensing electrode patterns 30-1 and 30-2 may each have a diamond shape and may be regularly arranged to be adjacent each other on the transparent substrate 20. A plurality of rows may be defined by the first sensing electrode patterns 30-1, and a plurality of columns may be defined by the second sensing electrode patterns 30-2.

A position detecting line 40 and an electrode connection structure 50 may be formed on the non-display region B. One end portion of the position detecting line 40 may be connected to each row of the first sensing electrode pattern 30-1 and each column of the second sensing electrode pattern 30-2. The other end portion of the position detecting line 40 may be connected to the electrode connection structure 50. The electrode connection structure 50 may be connected to an external driving circuit. For example, the position detecting line 40 and the external driving circuit may be electrically connected to each other via a pad 70 included in the electrode connection structure 50.

The term "electrical connection" used herein may indicate a connection between an electrode and a wiring. In exemplary embodiments, the electrode connection structure may have a wider area than that of the wiring for improving electrical connection reliability.

The electrode connection structure may be bonded to a conductive member (e.g., a flexible printed circuit board) for the electrical connection. The electrode connection structure may be cut in a predetermined size before a bonding process, and minute cracks may be generated near a cut line or a cut portion. Cracks may be expanded through the minute cracks by a stress applied during the bonding process to reduce an interlayer adhesion.

According to exemplary embodiments, an insulation layer including a plurality of holes on the pad and at least one first groove line between the pads may be formed to cover the pads so that fine cracks may be suppressed during a cutting process and stress from a bonding process may be dispersed by the holes and/or the groove line. Further, a contact area with a lower electrode or a lower wiring may be increased by the holes and the groove line so that an adhesion between elements or structures may be enhanced.

When a conductive material is deposited, coated or cured for forming a conductive member or a conductive layer in the electrode connection structure, bubbles may be generated between elements to degrade an adhesion force. However, according to exemplary embodiments, the bubbles may be removed through the groove line included in the insulation layer so that adhesion and structural reliability between elements may be further enhanced.

Figure 2:
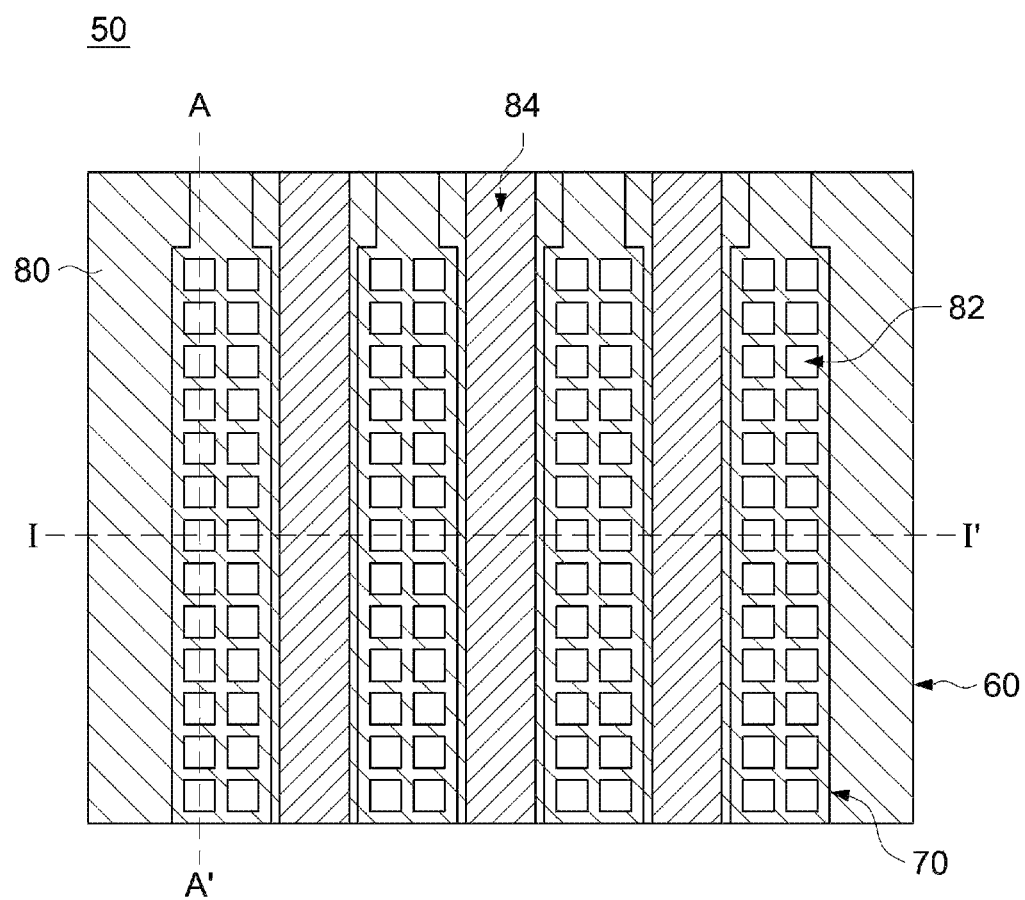
FIG. 2 is a schematic top plane view illustrating an electrode connection structure in accordance with an exemplary embodiment.
Figure 3:
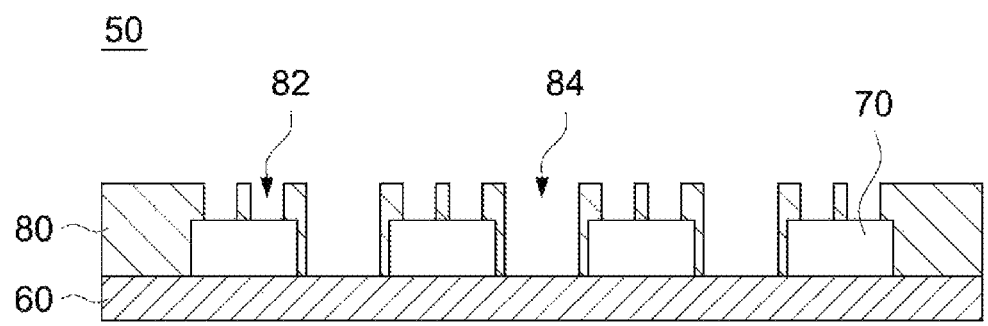
FIG. 3 is a schematic cross-sectional view illustrating an electrode connection structure in accordance with an exemplary embodiment.

FIG. 2 is a schematic top plane view illustrating an electrode connection structure in accordance with an exemplary embodiment. FIG. 3 is a schematic cross-sectional view taken along a line I-I' of FIG. 2.

Referring to FIGS. 2 and 3, an electrode connection structure 50 may include a substrate layer 60, a pad 70, an insulation layer 80 and a first groove line 84.

The substrate layer 60 may serve as a base layer on which members or structures of the electrode connection structure 50 may be disposed. For example, the substrate layer 60 may include a glass substrate or a flexible polymer film.

The polymer film may include, e.g., polyethylene (PE), polyethylene terephthalate (PET), polyethylene naphthalate (PEN), polyimide (PI), an acryl-based resin, cycloolefin polymer (COP), triacetyl cellulose (TAC), etc. These may be used alone or in a combination thereof.

A plurality of the pads 70 may be disposed on the substrate layer 60. For example, as illustrated in FIG. 2, a plurality of the pads 70 may form a plurality of parallel groups on the substrate layer 60.

One end of the pad may be electrically connected to an electrode terminal, e.g., a terminal of the position detecting line 40. In this case, the other end (e.g., an opposite end relative to the one end) of the pad 70 may be electrically connected to an external driving circuit so that the position detecting line 40 and the external driving circuit may be coupled to each other.

The pad 70 may be formed of a material having improved electrical conductivity. For example, the pad 70 may be formed of a metal, a conductive metal oxide and/or a conductive carbon.

The metal may include silver, gold, aluminum, molybdenum, copper, chromium, neodymium, etc., or an alloy thereof. The conductive metal oxide may include ITO (Indium Tin Oxide), IZO (Indium Zinc Oxide), AZO (Al-doped ZnO), TCO (Transparent conductive oxide), or the like. The conductive carbon may include a carbon nanowire, carbon nanotube, graphene, etc. These may be used alone or in a combination thereof.

In an embodiment, the pad 70 may include a metal core and a conductive non-metallic coating layer thereon.

The metal core may be formed as a single layered structure or a multi-layered structure. The conductive non-metallic coating layer may be formed as a single layered structure or a multi-layered structure.

The corrosion of the metal core may be prevented by the conductive non-metallic coating layer. The conductive non-metallic coating layer may be formed of the above-mentioned conductive metal oxide or the conductive carbon.

The insulation layer 80 may be formed to implement an insulation between the electrodes or between the pads 70. As illustrated in FIGS. 2 and 3, the insulation layer 80 may cover at least portions of the substrate layer 60 and the pad 70.

The insulation layer 80 may include a plurality of holes 82 formed on the pad 70, and at least one first groove line 84 intersecting between the pads 70 neighboring each other.

For example, as illustrated in FIGS. 2 and 3, a plurality of the holes 82 may be arranged in a predetermined shape at regions for an electrical connection with a conductive layer 90 (e.g., a conductive adhesive member such as ACF) described below so that the electrode connection structure 50 may be connected to another conductive member.

Additionally, an adhesive area and an adhesion force between the pad 70 and the conductive layer 90 may be increased by the insulation layer 60. For example, a contact surface between the insulation layer 80 and the pad 70 or between the insulation layer 60 and another conductive member may be increased by the holes 82 to improve the adhesion force.

Further, an interlayer adhesion of the electrode connection structure 50 may be improved by the insulation layer 80, so that defects such as delamination of the pad 70 during a cutting process may be avoided. A stress or pressure applied to the electrode connection structure 50 may be dispersed or absorbed by the insulation layer 80 so that cracks in the pad 70 or the electrode may be prevented.

In some embodiments, as illustrated in FIG. 2, a plurality of the holes 82 may be arranged on imaginary straight lines extending from one end to the other end of the pad 70 (e.g., a line A-A' in FIG. 2).

In some embodiments, the arrangement of the holes 82 may be properly adjusted or modified. For example, the holes 82 may be arranged regularly or randomly on the pad 70 such that the imaginary straight line (e.g., the A-A' line) extending from one end to the other end of the pad 70 may meet or cross at least one of the holes 82. For example, a plurality of the holes 82 may be arranged on the pad 70 as a mesh shape.

A size and a shape of the hole 82 may be properly adjusted based on a size and a shape of the conductive layer 90. For example, the hole 82 may have a polygonal shape or a circular shape. The polygonal shape may include triangle, quadrangle (e.g., rectangle, rhombus, etc.), hexagon, octagon, decagon, etc.

The insulation layer 80 may include an inorganic insulation material such as silicon oxide or silicon nitride, or an organic insulation material such as a photo-curable resin composition.

For example, in the formation of the hole 82 in the insulation layer 80, the inorganic insulation material may be deposited in a predetermined pattern using a mask, or may be wholly deposited and dry-etched to obtain the predetermined pattern. Alternatively, the photo-curable resin composition may be coated on the substrate layer 60 and/or the pad 70, exposed to light using a mask, and then developed to form the holes 82 at areas for connecting another conductive member.

The first groove line 84 may extend or intersect between the neighboring pads 70, and at least one first groove line 84 may be formed in the insulation layer 80.

The contact area or the surface area of the insulation layer 80 may be further increased by the first groove line 84 so that an adhesion with, e.g., the substrate layer 60, the pad 70 and/or the conductive layer 90 may be enhanced.

The stress applied to the electrode connection structure 50 may be also dispersed by the first groove line 84, and thus generation or propagation of cracks may be prevented while improving a flexible property of the electrode connection structure 50. Accordingly, process defects may be reduced and process reliability may be remarkably improved.

In a conventional electrode connection structure, when a conductive material is deposited, or coated and cured to form the conductive layer 90 described below on the insulation layer, bubbles are generated to deteriorate adhesion between elements or layers and cause process failures. However, according to exemplary embodiments, the electrode connection structure 50 may include the first groove line 84 in the insulation layer 80 so that the bubbles may be effectively removed or discharged to enhance adhesion between elements or layers.

The first groove line 84 may be formed by removing a portion of the insulation layer 80 between the neighboring pads 70. For example, the first groove line 84 may be formed by a process substantially the same as or similar to that for forming the hole 82.

A height and a depth of the first groove line 84 may be properly adjusted to increase the contact area of the insulation layer 80 and remove the bubbles while forming the conductive layer 90. For example, a surface of the substrate layer 60 may be exposed through the first groove line 84.

Figure 4:
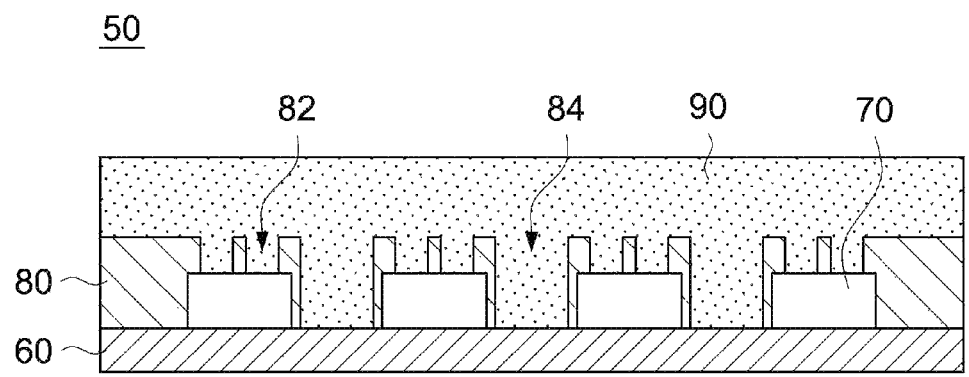
FIG. 4 is a schematic cross-sectional view illustrating an electrode connection structure in accordance with an exemplary embodiment.

FIG. 4 is a schematic cross-sectional view illustrating an electrode connection structure in accordance with an exemplary embodiment.

Referring to FIG. 4, the electrode connection structure 50 may further include the conductive layer 90 at least partially covering the pad 70 and the insulation layer 80.

As described above, the surface area of the insulation layer 80 may be increased by the holes 82 and the first groove line 84 so that an adhesion area and an adhesion force with the conductive layer 90 may be also increased.

Further, bubbles caused when the conductive layer 90 is formed on the substrate layer 60, the pad 70 and/or the insulation layer 80 may be removed through the first groove line 84 included in the insulation layer 80. Thus, process defects may be prevented and the adhesion force between the conductive layer 90 and the insulation layer 80 may be further enhanced.

For example, the conductive layer 90 may include an anisotropic conductive film (ACF) commonly used in the art.

Figure 5:
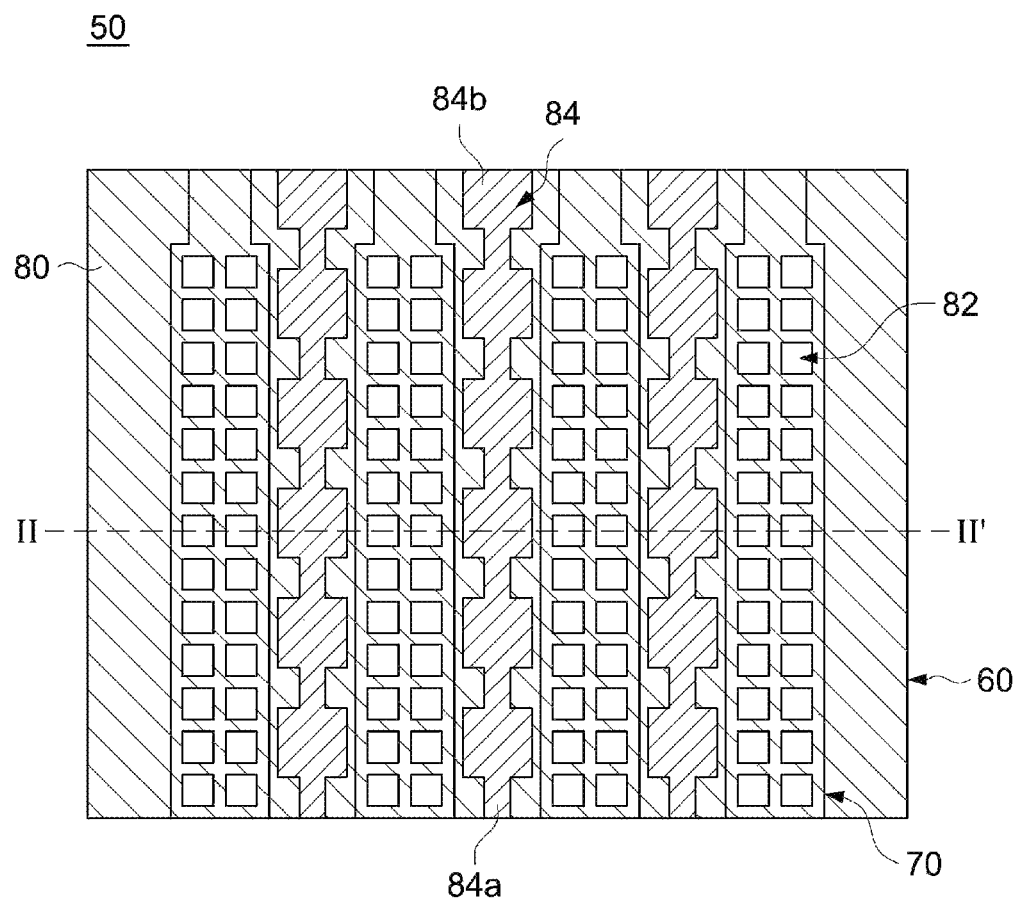
FIG. 5 is a schematic top plane view illustrating an electrode connection structure in accordance with an exemplary embodiment.
Figure 6:
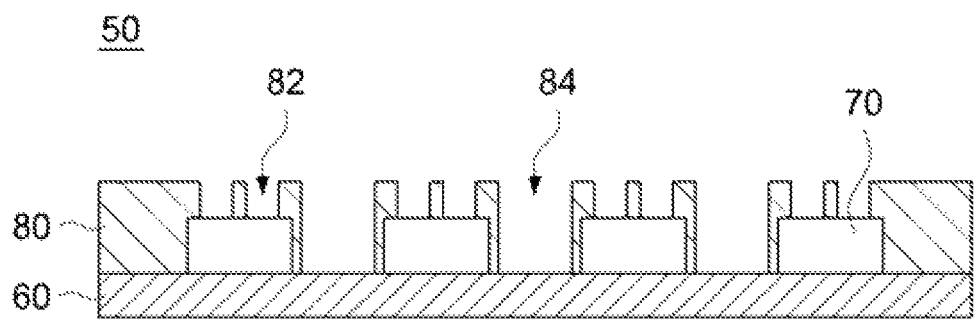
FIG. 6 is a schematic cross-sectional view illustrating an electrode connection structure in accordance with an exemplary embodiment.

FIG. 5 is a schematic top plane view illustrating an electrode connection structure in accordance with an exemplary embodiment. FIG. 6 is a schematic cross-sectional view taken along a line II-II' of FIG. 5.

Referring to FIGS. 5 and 6, the first groove line 84 may include portions having different widths in a plane view.

In some embodiments, as illustrated in FIG. 5, the width of the first groove line 84 may be periodically changed from one end 84a to the other end 84b (e.g., an opposite end of the one end) thereof. Thus, removal of the bubbles through the first groove line 84 may be further facilitated, and adhesion between elements may be also enhanced.

In some embodiments, as illustrated in FIGS. 5 and 6, a width of a terminal of the first groove line 84 formed on an end portion of the substrate layer 60 may not be a maximum width thereof. For example, the width of the one end 84a of the first groove line 84 formed on the end portion of the substrate layer 60 may be less than the width of the other end 84b of the first groove line 84.

In this case, pressure between elements may be increased due to a width change of the first groove line 84, and the bubbles may be more effectively removed through the one end 84a of the first groove line 84 having a relatively small width to also improve the adhesion between elements.

Figure 7:
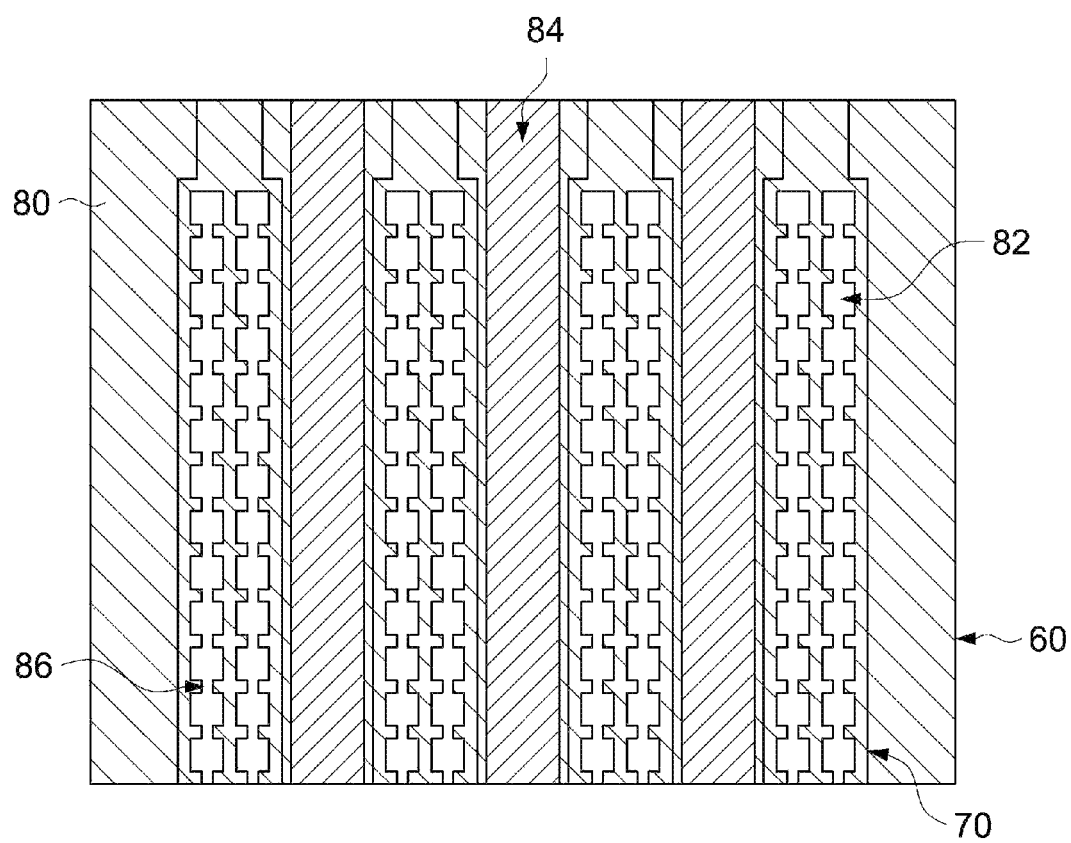
FIG. 7 is a schematic top plane view illustrating an electrode connection structure in accordance with an exemplary embodiment.

FIG. 7 is a schematic top plane view illustrating an electrode connection structure in accordance with an exemplary embodiment.

Referring to FIG. 7, the insulation layer 80 may extend from one end of the pad 70 to the other end (e.g., an opposite end relative to the one end) of the pad 70, and may further include at least one second groove line 86 which may connects at least two of the holes 82.

At least two holes 82 may be connected to or communicated with each other by the second groove line 86. Thus, the surface area of the insulation layer 80 may be further increased so that the adhesion between elements may be also increased. Additionally, pressure may be dispersed through the second groove line 86 to prevent cracks.

The bubbles generated when the conductive layer 90 or other conductive members are formed may be discharged or removed through the second groove line 86 to further enhance the adhesion between elements.

Figure 8:
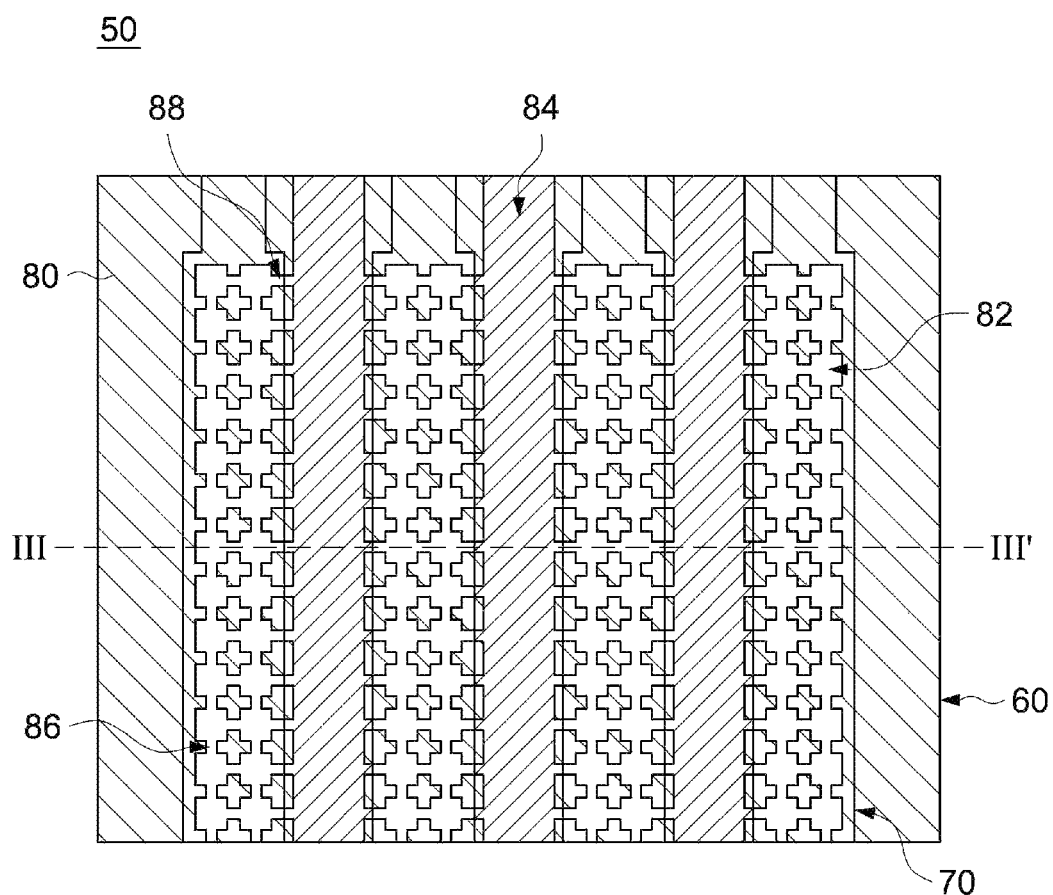
FIG. 8 is a schematic top plane view illustrating an electrode connection structure in accordance with an exemplary embodiment.
Figure 9:
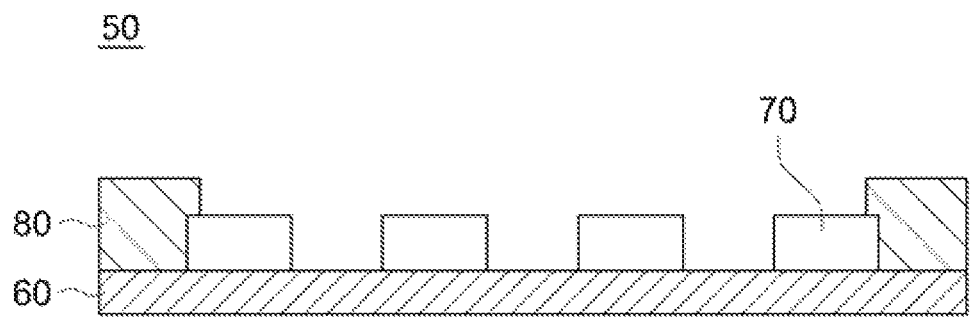
FIG. 9 is a schematic cross-sectional view illustrating an electrode connection structure in accordance with an exemplary embodiment.

FIG. 8 is a schematic top plane view illustrating an electrode connection structure in accordance with an exemplary embodiment. FIG. 9 is a schematic cross-sectional view taken along a line III-III' of FIG. 8.

Referring to FIG. 8, the insulation layer 80 may further include at least one third groove line 88 connecting the first groove line 84 and the second groove line 86 to each other.

The first groove line 84 and the second groove line 86 may be connected or communicated with each other via the third groove line 88. For example, the pad 70 and/or the substrate layer 60 may be exposed through the first groove line 84, the second groove line 86 and/or the third groove line 88

The third groove line 88 may extend to connect the first groove line 84 and the second groove line 86 adjacent to each other. Thus, the bubbles generated when the conductive layer 90 or other conductive members are formed may be more effectively discharged or removed to further enhance the adhesion between elements. The surface area of the insulation layer 80 may be further increased so that the adhesion between elements may be also increased and cracks may be prevented.

According to exemplary embodiments, an electronic device including the electrode connection structure 50 is provided.

The term "electronic device" used herein may include an electronic product or a component thereof including an electrode that requires an electrical connection.

According to exemplary embodiments, an image display device including the electronic device is provided. The image display device may include a flat panel display device such as a liquid crystal display (LCD) device, a field emission display (FED) device, a plasma display panel (PDP) device, an organic light emitting diode (OLED) display device, etc.

According to exemplary embodiments, a touch screen panel including the electronic device is provided.

If the electrode connection structure 50 is employed in the touch screen panel, a lower substrate and an upper protective layer may be also included. For example, a glass or a plastic film may be used as the lower substrate. An organic insulation layer, an inorganic insulation layer, an optical clearance adhesive (OCA), an optical clearance resin (OCR) may be used as the upper protective layer.

The touch screen panel may include a touch pattern commonly known in the related art.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

As illustrated in FIG. 2, pads each having a width of 100 μm and a thickness of 5100 Å were formed with a distance of 100 μm on a cyclo-olefin polymer (COP) substrate layer having a dimension of 71.05 mm×129.25 mm and a thickness of 47 μm. A silica-based insulation layer was formed to cover the substrate layer and the pads.

The insulation layer was partially removed by a photolithography process to form a plurality of holes and a first groove line. An area of the holes was 32.71% relative to an entire area of the pads, and a width of the first groove line was 80 μm.

An acryl-radical based anisotropic conductive film having a thickness of 75 μm and including Au/Ni-plated polymer balls (diameter: 10 μm) was formed on the substrate layer, the pads and the insulation layer to obtain an electrode connection structure of Example 1.

Example 2

Processes the same as those of Example 1 were performed except that a second groove line having a width of 10 μm and extending from one end to the other end of the pad was additionally formed as illustrated in FIG. 7 to connect the holes to obtain an electrode connection structure of Example 2.

Example 3

Processes the same as those of Example 2 were performed except that a third groove line having a width of 30 μm was additionally formed to connect the first groove line and the second groove line as illustrated in FIG. 8 to obtain an electrode connection structure of Example 3.

Example 4

Processes the same as those of Example 1 were performed except that a width of the first groove line was periodically changed between 30 μm and 80 μm, and a width of a terminal of the pad on an end portion of the substrate layer was 30 μm as illustrated in FIG. 5 to obtain an electrode connection structure of Example 4.

Example 5

Processes the same as those of Example 4 were performed except that a second groove line having a width of 10 μm and extending from one end to the other end of the pad was additionally formed to connect the holes to obtain an electrode connection structure of Example 5.

Example 6

Processes the same as those of Example 5 were performed except that a third groove line was additionally formed to connect the first groove line and the second groove line to obtain an electrode connection structure of Example 6.

Comparative Example 1

Processes the same as those of Example 1 were performed except that the holes and the first groove line were not formed.

Experimental Example (1) Evaluation on Crack Generation

Crack generation in the electrode connection structures of Examples and Comparative Example 1 was evaluated under conditions indicated in Table 1 below.

(2) Evaluation of Peel Adhesion

A flexible printed circuit board (FPCB) was attached to each electrode connection structure of Examples and Comparative Example 1 at a temperature of 155° C. and under a pressure of 7 kgf, and then a peel adhesion was measured while detaching the FPCB.

The peel adhesion was obtained by dividing a value from a peel adhesion measuring instrument by a length of the attached FPCB (1 cm in the experiment).

10 samples were evaluated in each Examples and Comparative Example, and average values were shown in Table 1 below.

TABLE 1

|  | Conditions of Evaluating Crack Generation | | | Crack Generation | | Peel Adhesion (g/cm) |
|---|---|---|---|---|---|---|
|  | pressure (kgf) | temperature (° C.) | time (sec) | Number of crack generation/Number of Evaluation | Number of Cracks |  |
| Example 1 | 6.4 | 155 | 10 | 3/10 | 15 | 751 |
|  | 10 | 155 | 10 | 4/10 | 21 |  |
| Example 2 | 6.4 | 155 | 10 | 1/10 | 13 | 803 |
|  | 10 | 155 | 10 | 3/10 | 16 |  |
| Example 3 | 6.4 | 155 | 10 | 1/10 | 9 | 840 |
|  | 10 | 155 | 10 | 2/10 | 11 |  |
| Example 4 | 6.4 | 155 | 10 | 0/10 | 9 | 895 |
|  | 10 | 155 | 10 | 1/10 | 10 |  |
| Example 5 | 6.4 | 155 | 10 | 1/10 | 3 | 987 |
|  | 10 | 155 | 10 | 1/10 | 7 |  |
| Example 6 | 6.4 | 155 | 10 | 0/10 | 0 | 1057 |
|  | 10 | 155 | 10 | 0/10 | 0 |  |
| Comparative Example 1 | 6.4 | 155 | 10 | 6/10 | 51 | 540 |

Referring to Table 1 above, in the electrode connection structures of Examples, adhesion between elements and peel adhesion were enhanced by the holes and the groove lines. Thus, the number of cracks was reduced and high peel adhesion was achieved. The electrode connection structure of Comparative Example showed poor reliability and peel adhesion.

What is claimed is:

1. An electrode connection structure, comprising:
   a substrate layer;
   pads on the substrate layer;

an insulation layer at least partially covering the substrate layer and the pads, the insulation layer including a plurality of holes on the pads and at least one first groove line extending between the pads neighboring each other; and an anisotropic conductive film filling the plurality of holes and the at least one first groove line to be connected to the pads, wherein the plurality of the holes and the at least one first groove line are formed through the insulation layer, and the at least one first groove line is defined by sidewalls of the insulation layer and a top surface of the substrate layer;

the at least one first groove line extends to an end portion of the substrate layer so that bubbles are removed therethrough;

the at least one first groove line includes a first portion and a second portion having different widths from each other, and the first portion and the second portion are alternately repeated so that a width of the at least one first groove line is changed periodically from one end to an opposite end thereof; and the at least one first groove line does not overlap the pads in a plan view and is not included within the pads.

2. The electrode connection structure according to claim 1, further comprising a conductive layer at least partially covering the pads and the insulation layer.

3. The electrode connection structure according to claim 1, wherein the plurality of the holes are arranged along a direction from one end of a pad to an opposite end relative to the one end of the pad.

4. The electrode connection structure according to claim 1, wherein a width of a terminal of the at least one first groove line on the end portion of the substrate layer is not a maximum width of the at least one first groove line.

5. The electrode connection structure according to claim 1, wherein the insulation layer further includes at least one second groove line which extends from one end of a pad to an opposite end relative to the one end of the pad, and connects at least two holes of the plurality of the holes.

6. The electrode connection structure according to claim 5, wherein the insulation layer further includes at least one third groove line connecting the at least one first groove line and the third groove line neighboring each other.

7. The electrode connection structure according to claim 1, wherein each of the pads includes a metal core and a conductive non-metallic coating layer thereon.

8. The electrode connection structure according to claim 7, wherein each of the pads has a multi-layered structure.

9. The electrode connection structure according to claim 7, wherein the conductive non-metallic coating layer has a multi-layered structure.

10. The electrode connection structure according to claim 1, further comprising electrodes on the substrate layer, wherein the pads are connected to end portions of the electrodes.

11. An electronic device including the electrode connection structure according to claim 1.

12. An image display device including the electronic device according to claim 11.

13. A touch screen panel including the electronic device according to claim 11.

14. The electrode connection structure according to claim 1, wherein the first portion is positioned at one end of the substrate layer, and the second portion is positioned at the other end, opposite to the one end, of the substrate layer.

* * * * *